United States Patent
Luo

[19]

[11] Patent Number: 6,134,339
[45] Date of Patent: Oct. 17, 2000

[54] METHOD AND APPARATUS FOR DETERMINING THE POSITION OF EYES AND FOR CORRECTING EYE-DEFECTS IN A CAPTURED FRAME

[75] Inventor: Jiebo Luo, Pittsford, N.Y.

[73] Assignee: Eastman Kodak Company, Rochester, N.Y.

[21] Appl. No.: 09/154,684

[22] Filed: Sep. 17, 1998

[51] Int. Cl.[7] .................................................. G06K 9/00
[52] U.S. Cl. .......................... 382/115; 382/117; 382/291
[58] Field of Search ................................. 382/115, 117, 382/190, 192, 194, 218, 274, 291, 103, 221, 100, 141; 351/206, 207, 208, 247, 212; 348/576

[56] References Cited

U.S. PATENT DOCUMENTS

| | | |
|---|---|---|
| 5,231,674 | 7/1993 | Cleveland et al. . |
| 5,325,133 | 6/1994 | Adachi . |
| 5,432,863 | 7/1995 | Benati et al. . |
| 5,570,434 | 10/1996 | Badique . |
| 5,680,481 | 10/1997 | Prasad et al. . |
| 5,790,234 | 8/1998 | Matsuyama ............................. 351/212 |
| 5,850,466 | 5/2000 | Schott ..................................... 382/141 |
| 5,978,494 | 11/1999 | Zhang ..................................... 382/117 |
| 5,990,973 | 11/1999 | Sakamoto ............................... 348/576 |
| 6,016,354 | 1/2000 | Lin et al. ................................. 382/117 |
| 6,064,752 | 5/2000 | Rozmus et al. ........................ 382/100 |

*Primary Examiner*—Amelia Au
*Assistant Examiner*—Vikkram Bali
*Attorney, Agent, or Firm*—Thomas H. Close

[57] ABSTRACT

The present apparatus and method captures at least a pair of images in relatively quick succession with an illumination source being fired during the capture of one of the images. The illumination source is located adjacent to the optical lens or close to the optical axis of the camera. Next the illumination level of the images is compensated to make them equal in illumination. Following that an analysis of the images is performed to determine the difference between the illumination compensated images. After the illumination compensation the difference has to be caused by eye-defects or specular reflections from glasses. The pixel coordinates of the transitory eye-defect regions are recorded and analyzed to determine the spacing of the potential eye locations and/or the spatial structure of the eyes for plausibility. Once confirmed the coordinates are output and recorded.

40 Claims, 5 Drawing Sheets

METHOD AND APPARATUS FOR DETERMINING THE POSITION OF EYES AND FOR CORRECTING EYE-DEFECTS IN A CAPTURED FRAME

FIELD OF THE INVENTION

The invention relates generally to the field of digital image processing, and in particular detecting human eyes or even animal eyes in digital images. More specifically, the invention relates to a method and apparatus for fast and accurate eye detection by taking advantage of the red-eye effect, in case human beings are captured by the apparatus. Animal eyes may be detected by taking advantage of the eye-defect in images captured together with a flash light. In case of animal eyes the regions of an image showing the eye-defect are usually visible as bright green or yellow spots in the captured image frame.

Additionally, the invention relates to a method and apparatus for fast and automatic correction of eye-defects in captured image frames.

BACKGROUND OF THE INVENTION

The increased use of computers in many applications has drawn increasing focus on improving the man-machine interface. It is the desire of many applications to locate the face of the user, then to process it to robustly identify the person (for entitlement benefits recipients, for national border crossings or secure area entry verification, as a replacement for the ubiquitous PIN numbers, etc.). The algorithms for facial recognition have dramatically improved in recent years and are now sufficiently robust for many applications. The weak part of the system is the face detection and location front-end system. Other applications for facial imaging beyond identification are growing in interest, in particular perceptual computing, such as discerning a reaction or emotion from a user's face. This would enable computer-driven systems to be more responsive, like a human. Again, these algorithms will be limited by the weaknesses in face detection and location.

Figure 1:
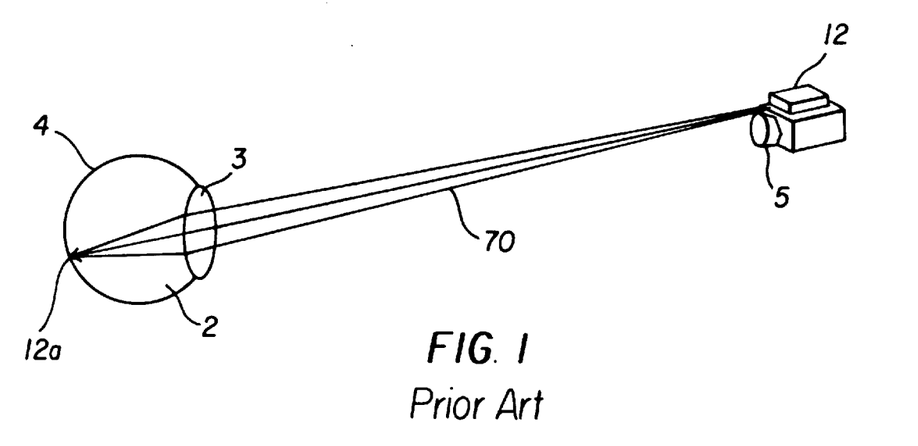
FIG. 1 is an illustration of how the light rays from an illumination source get into individual's eyes and form an image of the illumination source on the retina.

When flash illumination is used during the capture of an image that contains sizable human faces, the pupils of people sometimes appear red because the light is partially absorbed by capillaries in the retina. As illustrated in FIG. 1, the light rays 70 from the flash illumination source 12 enter the eye 2 through the eye lens 3, and form an image 12a of the illumination source 12 on retina 4. The eye-defect in captured images, known as the "red-eye effect" is mostly seen with human eyes. In case animals are captured, the eye-defect will show a bright green or yellow color. Animal eyes are generally more difficult to detect for pattern recognition algorithms due to the large variations in animal facial structure, complexion, hair and structure of the eyes itself.

Figure 2:
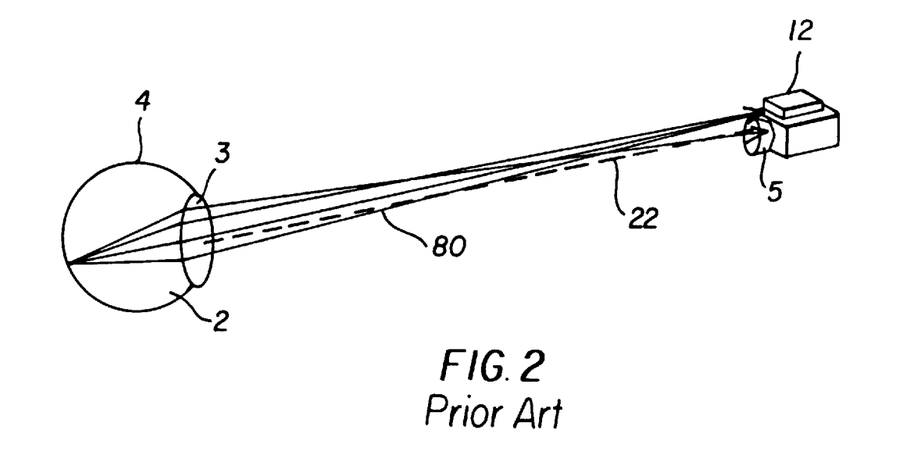
FIG. 2 is an illustration of how the light rays reflected from the retina get into a camera's lens mounted close to the illumination source.

Referring now to FIG. 2, the light rays 80 reflected from the retina 4 exit the eye 2 through the eye lens 3, and finally enter the camera lens 5. If the camera lens 5 is placed close to the illumination source 12, the red-eye effect will be maximized. In other words, the amount of red-eye or eye-defect being observed increases as the illumination source 12 gets closer to an optical axis 22 defined by the camera lens 5 (see also FIG. 3).

The general technique for red-eye reduction in cameras has been to impact two parameters: (a) Reduce the pupil diameter of the subject, for example by emitting a series of small pre-flashes prior to capturing the desired image with full illumination; and, (b) Increase the flash to lens separation, so that the illumination impinging on the subjects eyes is reflected at an angle that misses the taking lens.

A number of U.S. patents reflect the art prior to this invention. Each will be discussed:

U.S. Pat. No. 5,570,434, issued Oct. 29, 1996 to Badique, entitled "Circuit Arrangement For Recognizing A Human Face", describes a circuit for recognizing a human face in a sequence of video images. The circuit includes the steps of subtracting two consecutive image frames and using the areas of difference to determine if there is a moving object. The difference map receives further post-processing, culminating in a convolution to determine if a head and shoulders feature set is present in the scene.

U.S. Pat. No. 5,680,481, issued Oct. 21, 1997 to Prasad et al., entitled "Facial Feature Extraction Method and Apparatus for a Neural Network Acoustic and Visual Speech Recognition System", describes another approach to facial feature identification and extraction. In this patent, the variation in gray scale tones from a dull frontal face image are used to locate the eyes and mouth by thresholding the pixel values and finding centroids of the three areas.

Many other prior art documents deal more specifically with eye or gaze tracking, or iris recognition methods or, face matching methods.

U.S. Pat. No. 5,325,133, issued Jun. 28, 1994 to Adachi, entitled "Device for Measuring a Retina Reflected Light Amount and a Gaze Detecting Apparatus Using the Same" describes a device for measuring reflected light from a retina and detecting the direction in which the user is looking with an apparatus. This apparatus directs three sources of infrared emission, located at three different positions, toward a user's eyes. The system locates the pupils by pattern recognition or by red-eye ("detecting the frequency components corresponding to hemoglobin which is abundantly contained in the light reflected by the retina"). It then processes the retinal reflection based on the displacement angles to determine where the user's gaze is directed. Thus, the apparatus functionality is keyed to computing the gaze angle from the three dimensional angular measurements, instead of locating eyes. This art does not mention the issue of spacing between emission source and image capture device. It teaches away from the current invention by its dependence on measuring angular separation between emission source and image pick-up source for a minimum of three emitter/detector pairs.

U.S. Pat. No. 5,231,674 issued Jul. 27, 1993 to Cleveland et al., entitled "Eye Tracking Method and Apparatus" describes a system to determine the direction that a person is gazing, determining the point at which he is gazing, or measuring the motion of his eye. The outputs of this apparatus are locations of eye features such as edge coordinates between the pupil and iris of the eye and of the center coordinates of light reflections off the cornea of the eye. An image intensity profile taken through a cross section of the eye iris, pupil (illuminated using the bright-eye effect and the corneal reflection is extracted knowing the size of the eye, inferred from the distance between the eye and the cameras). Then, the extracted profile is smoothed. The peak region (defined by a set of thresholds) near the center of the smoothed profile is detected as the corneal region. Typically the relative intensities of the iris and the pupil are not sufficiently different to make the image processing easy. Therefore, the bright-eye effect is used in this method and apparatus to increase the contrast ratio between the pupil and its surrounding iris. Consequently, the contrast ratio between the iris and the bright pupil in the camera image can be made significantly greater than the contrast ratio between the iris and a dark pupil. With the increased contrast ratio, image processing algorithms can locate the pupil edges and center more reliably and accurately for the particular eye gaze-tracking application. It would be noted that this method and apparatus assumes known eye location and eye size (on the camera optical axis and at a fixed distance) and is designed to track the eye gaze for speech impaired and physically handicapped persons. Moreover, this method and apparatus uses temporal changes in monochrome images and, thus, no color information.

U.S. Pat. No. 5,432,863 issued Jul. 11, 1995 to Benati et al., entitled "Automated Detection and Correction of Eye Color Defects Due to Flash Illumination" describes a means to automatically detect and correct red-eye defects due to flash illumination in still images. The method includes means for determining whether a still image artifact is truly a red-eye problem based on shape, coloration, and brightness.

SUMMARY OF THE INVENTION

It is an object of this invention to provide a method for determining the position of eyes within a captured image frame and thereby overcoming one or more problems as set forth above.

One of the preferred methods of the present invention is a method for determining the position of eyes within a frame of captured image data comprising the steps of:

capturing two color frames of an image scene wherein one frame is captured with an ambient illumination and the other frame is captured with an additional illumination;

storing said frames of said image scene in a memory;

compensating said frames for the overall illumination change between said two captured frames to obtain a compensated frame;

determining the difference between said compensated frame and an uncompensated frame of said two captured frames to obtain a compensated color difference image;

scanning said compensated color difference image and determining pairs of regions of high intensity pixel value in at least one color channel; and outputting the data of pixel pair coordinates wherein each coordinate corresponds to a center of each region of high intensity pixel value in said color channel within said captured image scene.

A further object of this invention is to provide an apparatus capable of performing each of the above steps. An apparatus according to the invention comprises:

means for capturing at least two color frames of an image scene, said means is provided with an optical lens defining an optical axis;

means for storing the data of at least two consecutive captured color frames of an image scene;

an illumination source for illuminating one of said captured color frames of said image scene wherein said illumination source is positioned as close as possible to said optical axis;

electronic means a) for compensating said frames for the overall illumination change between said two captured frames to obtain a compensated frame;

b) for determining the difference between said compensated frame and an uncompensated of said two captured frames to obtain a compensated color difference image;

c) for scanning said compensated color difference image and determining pairs of regions of high intensity pixel value in at least one color channel; and d) for outputting the data of pixel pair coordinates wherein each coordinate corresponds to a center of each region of high intensity pixel value in said color channel within said captured image.

This invention describes electronics for imaging a consumer's face and providing an output video stream as well as the coordinates of the eyes, if a face is present in the image frame. This invention will describe the application of a unique combination of conventional technology to deliver inexpensively and robustly the eye coordinates.

It is however, the novelty of this invention to take advantage of the physical cause of the red-eye effect and use it to facilitate fast and accurate eye detection. Accurate eye detection will enable enhancement and manipulation of images containing one or more human faces. For example, red-eye correction can be reliably performed.

A further object of the invention is to describe a method for a digital camera capable of locating eye-defects in a captured image, in frame and either removing the eye-defects in the camera or recording the locations of the eye-defects in an image frame to enable eye-defect removal in the photo-finishing stage. Another method of the present invention is a method used in a digital camera capable of locating eye-defect regions comprising the steps of:

selecting a function of the digital camera for eye-defect free picture taking;

capturing two color frames of an image scene with a minimum delay in between to minimize spatial registration error wherein one frame is captured with an ambient illumination and the other frame is captured with an additional camera triggered illumination;

storing data, representing said two captured frames in a memory;

compensating said frames for the overall illumination change between said two captured frames to obtain a compensated frame;

determining the difference between said compensated frame and an uncompensated frame of said two captured frames to obtain a compensated color difference image;

scanning said compensated color difference image and determining pairs of regions of high intensity pixel value in at least one color channel; and obtaining the data of pixel pair coordinates wherein each coordinate corresponds to a center of each of said eye-defect regions.

A further object of this invention is to provide a digital camera capable of performing each of the above steps. A digital camera according to the invention comprises:

a user input control for initiating the eye-defect correction function of the digital camera;

means for capturing two color frames of an image scene with a minimum delay between to minimize spatial registration error, wherein said capturing means is provided with an optical lens defining an optical axis;

an illumination source for illuminating one of the two frames of said image scene wherein said illumination source is positioned as close as possible to said optical axis;

means for storing the data of said two captured frames of said image scene; and electronic means a) for compensating said frames for the overall illumination change between said two captured frames to obtain a compensated frame b) for determining the difference between said compensated frame and an uncompensated of said two captured frames to obtain a compensated color difference image;

c) for scanning said compensated color difference image and thereby determining pairs of regions of eye-defect, and calculating spatial coordinates of said eye-defects.

An additional object of the invention is to describe a method implemented in a photographic film camera which is capable of recording the locations of the detected eye-defects on the photographic film inside the camera. The removal of the detected eye-defects is done in the photofinishing stage. This object is accomplished by a method used in a photographic film camera capable of locating eye-defect regions comprising the steps of:

selecting a function of the photographic film camera for eye-defect free picture taking;

exposing the photographic film with a frame of an image scene bearing the camera triggered illumination and simultaneously storing data of said frame bearing the camera triggered illumination in a memory;

capturing a further frame of said image scene with a minimum delay in between to minimize spatial registration error, wherein said frame is captured with an ambient illumination, and storing data representing said frame in said memory;

compensating said frames for the overall illumination change between said two captured frames to obtain a compensated frame;

determining the difference between said compensated frame and an uncompensated frame of said two captured frames to obtain a compensated color difference image;

scanning said compensated color difference image and determining pairs of regions of high intensity pixel value in at least one color channel;

obtaining data of pixel pair coordinates corresponding to the pairs of region of high intensity value wherein each coordinate corresponds to a center of each of said eye-defect regions; and recording on the photographic film inside the camera coordinates of said pairs of regions of high intensity pixel value preferable in the red channel.

A further object of this invention is to provide a photographic film camera capable of performing each of the above steps. A photographic film camera according to the invention comprises:

a user input control for initiating the eye-defect free function of the film camera;

means for capturing two frames of an image scene with a minimum delay between to minimize spatial registration error, wherein said capturing means is provided with an optical lens defining an optical axis;

an illumination source for illuminating one of said two frames of said image scene, wherein said illumination source is positioned as close as possible to said optical axis;

a photographic film having a recording layer for capturing said illuminated frame of said image scene;

means for temporarily storing data of said illuminated frame and data of a frame bearing ambient illumination of said image scene;

electronic means a) for compensating said frames for the overall illumination change between said two captured frames to obtain a compensated frame, b) for determining the difference b between said compensated frame and an uncompensated frame of said two captured frames to obtain a compensated color difference image;

c) for scanning said compensated color difference image and thereby determining pairs of regions of eye-defect, and calculating spatial coordinates of said eye-defects; and recording means for writing the spatial coordinates of the eye-defects in said recording layer on said photographic film inside said photographic film camera.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

1. technique quickly determines the location of eyes in an inexpensive and robust manner; and
2. technique enables eye-defect free photography.

BRIEF DESCRIPTION OF THE DRAWINGS

To facilitate understanding of the invention, identical reference numerals have been used, where possible, to designate identical elements that are common to the figures.

DETAILED DESCRIPTION OF THE INVENTION

Figure 3:
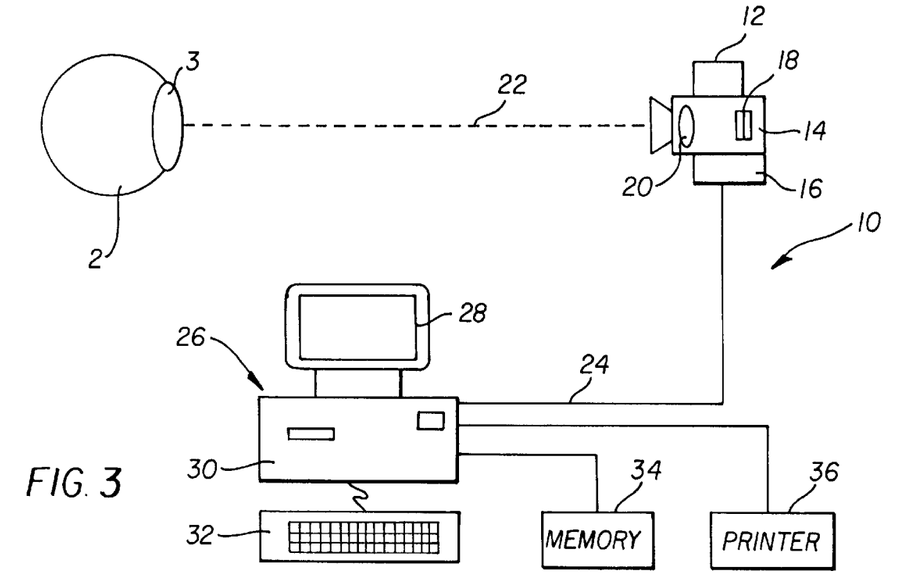
FIG. 3 is an illustration of an eye detection apparatus.

The configuration of an apparatus for determining the position of eyes within a captured image frame is depicted in FIG. 3. This system can be used for a number of applications, including user identification (e.g., for ATM), user monitoring (e.g., for checking the alertness of car drivers), and pose optimization for ID photo taking (with audio feedback instructions generated by the photo-taking system when red-eye effect is maximized). In particular, eye location can be used to perform spatial normalization of the face for face recognition, model-based face image compression, etc. In addition, eye movement and iris motion can be monitored to check if a driver is still alert. The apparatus 10 includes an illumination source 12 which is attached to means 14 for capturing at least two image frames of an image scene. In the embodiment as shown in FIG. 3, the means 14 for capturing is a video camera. A driver circuit 16 is attached to the video camera and a frame grabber 18 is positioned in the video camera. Additionally the video camera is provided with an optical lens 20 which defines an optical axis 22. The video camera is connected by an electric cable 24 to electronic means 26. The electronic means comprises a monitor 28, a computer 30, a keyboard 32, a storage or a memory 34, and a printer 36. The illumination source 12 may include a lamp or an infra-red firing device, power supply and triggering circuit (not shown). A key element of the configuration is to use the smallest spacing between the illumination source 12 and the optical lens 20. In other words, the illumination source 12 should be placed as close to the camera's optical axis 22 as possible. This will give the narrowest retinal reflection angle and thus the strongest eye-defect to make a robust pupil location feature. On the contrary, common practice in conventional camera design is to make the angle between these components as large as possible to minimize the reflection which causes an eye-defect in images.

The present invention utilizes the red-eye phenomenon to serve as a feature for locating the coordinates of human eyes within a captured frame of an image scene. On the other hand even animals' eyes can be located within an image scene. In this case the eye-defect is not a red-eye effect, as with human eyes, instead it is of green or yellow color. In order to detect animals' eyes within an image scene, the apparatus 10 has to scan the image for bright regions in the green channel.

Figure 6:
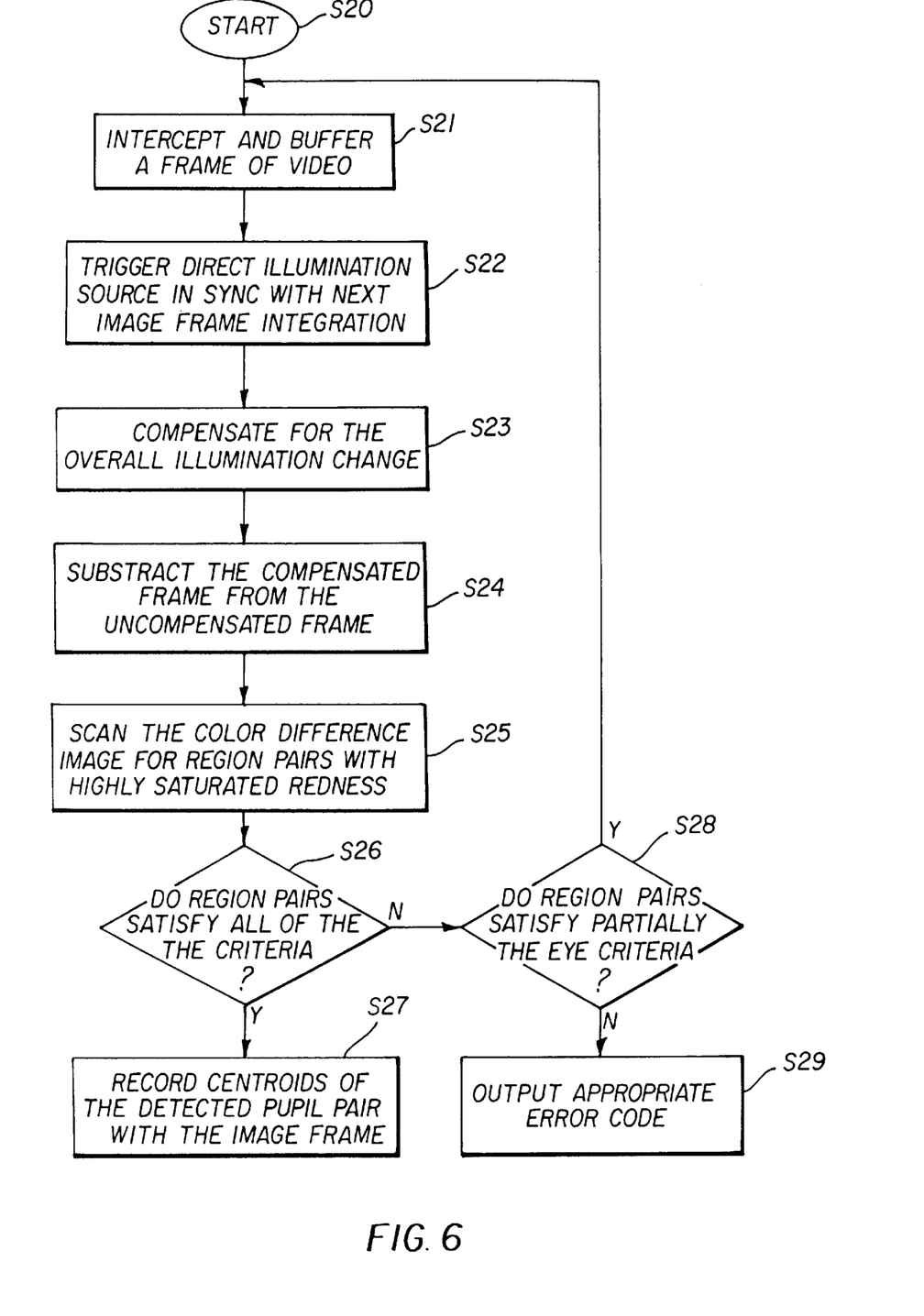
FIG. 6 is a block flow diagram representing the operating functionality of the apparatus as disclosed in the embodiment of FIG. 3.

Referring now to FIG. 6, there is shown a block flow diagram for the basic operational functionality for eye coordinate detection using the apparatus of FIG. 3. The initial assumption is that the video camera 14 is live, capturing images when the face coordinate detection ensues. After pressing start S20 first, a color frame of video with ambient illumination is saved S21 to the storage 34. Next, the illumination source 12 is triggered so that light is emitted and the next color video frame S22 is captured with an additional illumination. The captured frames are compensated S23 for the overall illumination change between the two captured frames to obtain a compensated frame. The compensated frame is subtracted S24 from an uncompensated frame of the two captured frames to obtain a color compensated difference image. The uncompensated frame can be either the frame bearing the ambient illumination or the frame bearing the additional illumination. The compensated color difference image is scanned for any pairs of regions that have high intensity pixel values, particularly in at least one color channel S25, especially when the location of human eyes are determined, the method scans for pairs of regions that have high intensity pixel values, particularly in the red channel. In the case that animal eyes are to be located in a captured image frame, the method scans for regions of high intensity values particularly in the green channel. The high intensity region pairs may be further processed to determine if they have the expected color, size, shape, structure, and spacing to plausibly represent the eye locations on a human face S26. If these conditions are satisfied, the pixel pair coordinates of the centers of the regions of high intensity pixel value corresponding to the centers of the pupil regions within the image frame are recorded together with the captured image S27. If the conditions are not completely satisfied, alternative error correcting measures may be taken. If no high intensity regions in the compensated difference image are detected, that state is indicated S29 to the electronic means 26. If the conditions are partially satisfied, that state is indicated to the computer 30, which will send control signals to the driver circuitry 16 to capture another set of images and test again S28.

Figure 4:
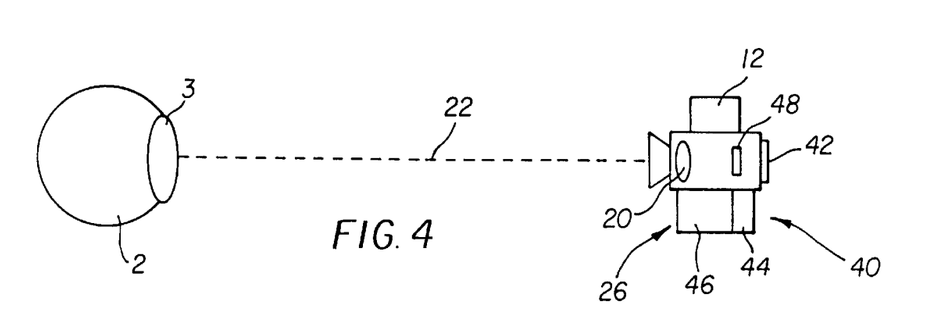
FIG. 4 is an illustration of an eye-defect free digital camera.

Referring now to FIG. 4, the function of eye-defect free picture taking can be enabled by a user input control 42 which is part of a digital camera 40. The digital camera 40 comprises an illumination source 12 and electronic means 26. The electronic means 26 includes a central processing unit 44 and a memory 46. For capturing the individual frames of an image scene, the digital camera 40 is provided with an optical lens 20 which defines an optical axis 22. The optical lens 20 and an image taking sensor 48 are aligned on the optical axis 22.

Figure 7:
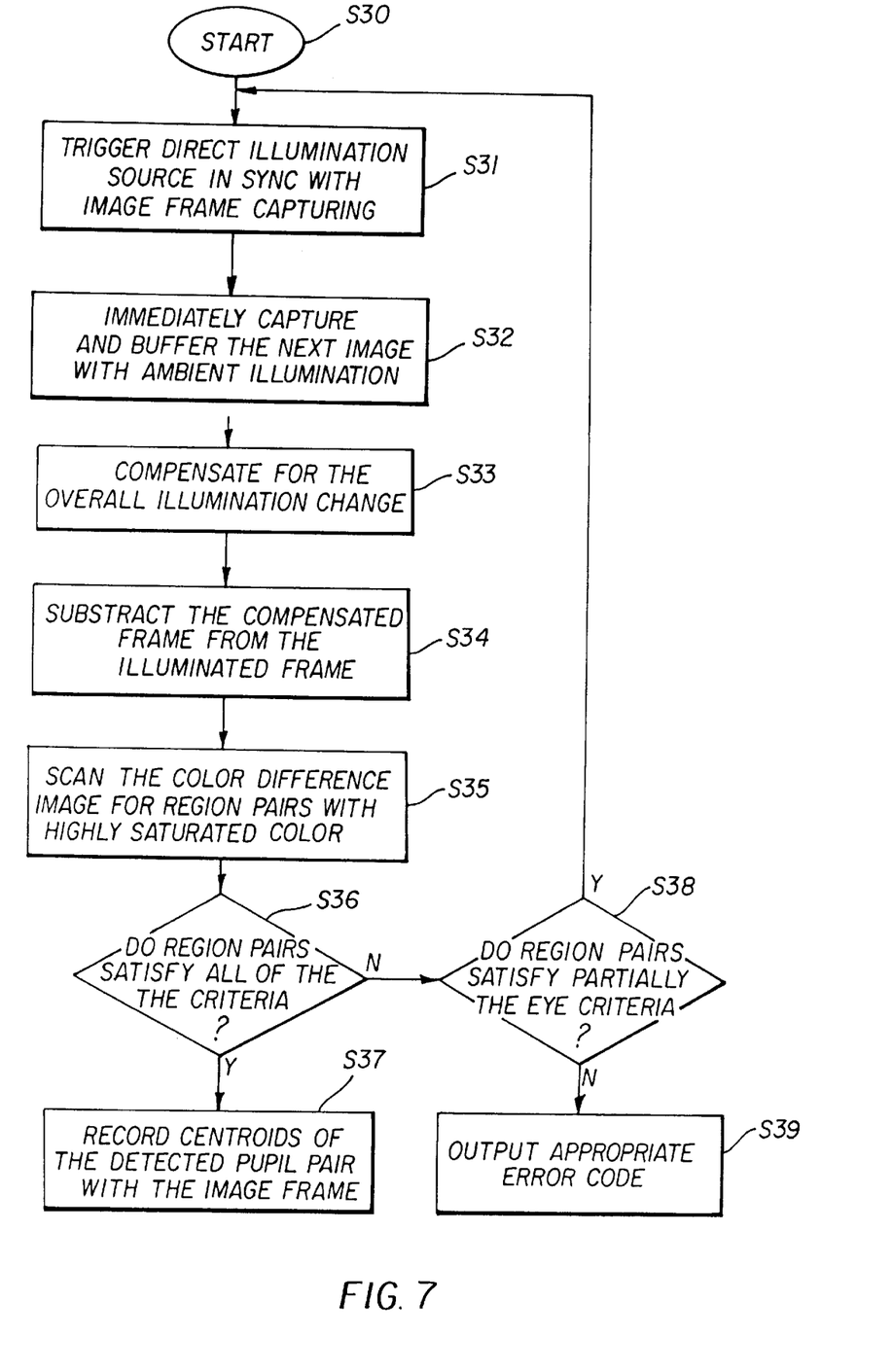
FIG. 7 is a block flow diagram representing the operating functionality of the camera embodiments shown in FIGS. 4 and 5.

The operation steps are illustrated in FIG. 7. After initiation S30 of the process, two color frames of an image scene are captured with minimum delay in between to minimize optical registration error. One frame S32 is captured with an ambient illumination and the other frame is captured S31 with an additional camera triggered illumination.

These two images are stored in the memory 46 where software or firmware residing in the camera memory 46 performs the brightness compensation S33, differencing and confirmation operations in the central processing unit 44. A compensated color difference image is obtained by determining S34 the difference between the compensated image and an uncompensated image. The compensated color difference image is then scanned S35 for regions of high intensity pixel value in at least one color channel. As mentioned above, the eye-defect to be detected can be the red-eye effect, known from human eyes or a yellow-eye or green-eye effect as known from animal eyes. In order to detect the red-eye effect, the compensated color difference image has to be scanned for regions of high intensity pixel value in the red channel. To locate animal eyes within an image frame, the compensated color difference image has to be scanned for regions of high intensity pixel value in the green channel. Once the data of the pixel pair coordinates are obtained, and the detected region does satisfy S36 all of the eye criteria, the eye-defect correction may be performed automatically in the digital camera 40. Furthermore, the user can select to record S37 the spatial coordinates of the eye-defect regions along with the captured eye-defect image in the memory 46 of the digital camera. The correction for the eye-defect is performed in the photofinishing lab. In case the detected eye regions do not satisfy all of the eye criteria S38, the detection procedure will be started again. An error code will be outputted if none of the eye criteria is detected S39.

Figure 5:
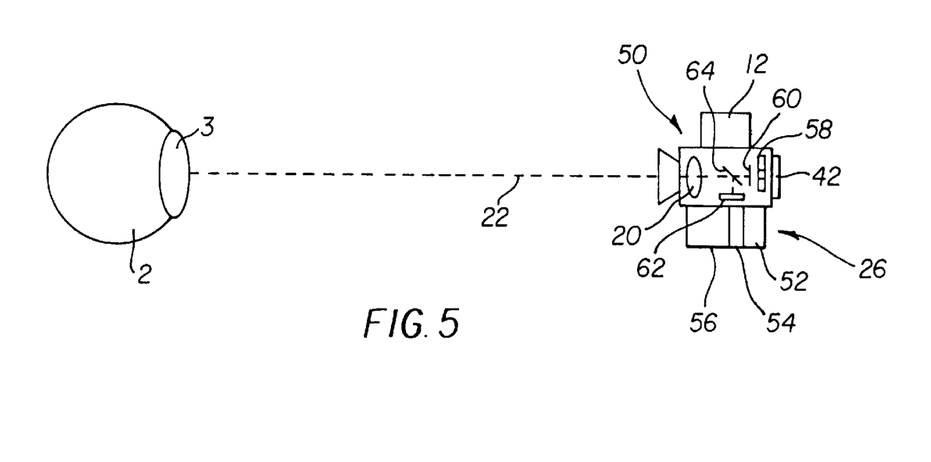
FIG. 5 is an illustration of an eye-defect free photographic film camera.

Referring now to FIG. 5, the function of eye-defect free picture taking is implemented in a photographic film camera 50. A user can enable the function by a user input control 42. The photographic film camera 50 comprises an illumination source 12, which in one embodiment is a flash light emitting unit. Additionally, electronic means 26 are provided, which include a camera built in central processing unit 52, a memory 54 for temporary storing and recording means 56. The recording means are designed to record information on a photographic film 58 inside the camera 50. For capturing the image frames the camera 50 is provided with an optical lens 20 which defines an optical axis 22. The photographic film 58 and the optical lens 20 are aligned on the optical axis 22. Prior to the photographic film 58, a shutter 60 is located which allows the exposure of the photographic film 58. Additionally the camera 50 has a built-in image sensor 62 which is located aside from the optical axis 22. A semi-transparent mirror 64 is tilted at an angle of 45° with respect to the optical axis 22 in order to direct light from the image scene simultaneously onto the photographic film 58 and onto the image sensor 62.

The operation steps of the photographic film camera 50 are also illustrated in FIG. 7. After selecting the function for eye-defect free picture taking, the camera will capture an image scene and thereby expose the photographic film 58 with a frame of the image scene bearing the camera triggered illumination. Parallel to the exposure of the photographic film 58, the image sensor 62 is exposed with the same frame and the data representing the frame are stored in the memory 54. A further frame of the image scenes is captured with a minimum delay in between to minimize spatial registration error. This frame is captured with an ambient illumination and the light coming from this frame is used solely to expose the image sensor 62. The data representing the frame is stored also in the memory 54. Software or firmware residing in said memory 54 of said photographic film camera 50, performs the brightness compensation, differencing and confirmation operations in the central processing unit 52. A detailed description of the process performed in the central processing unit 52 is already mentioned in the paragraph describing the process in the digital camera 40.

After the electronic means 26 in the photographic film camera 50 has located and determined the pairs of regions of high intensity pixel value in at least one color channel, the data corresponding to the center of each of the eye-defect region is recorded on the photographic film 58 inside the camera 50. In one embodiment the photographic film 58 and the camera 50 are a film and camera from the Advanced Photo System. The recording of the data is a magnetic recording in the magnetic layer of the exposed photographic film 58. The photographic film camera 50 provides recording means 56 which can record in the magnetic layer of the photographic film 58.

The following description is limited to one procedure of capturing frames of an image scene. The first picture or image frame is captured with the camera triggered illumination, and the second picture or image frame is captured with an ambient illumination. Nevertheless, the above is not considered as a limitation since it is obvious to any person skilled in the art to carry out the above procedure in that the first captured image frame bears the ambient illumination. This method or procedure is particularly advantageous for a digital camera or a film camera: (1) the spatial registration error is minimized to benefit the differencing operation; (2) the flash unit of the camera will not be recharged in time for second firing; and (3) the non-flash image is captured and buffered only as needed.

More specifically the illumination compensation step S23 (see FIG. 6), or S33 (see FIG. 7) is performed in the following fashion. The following description shows, that the first image is captured with ambient illumination and the second image is captured together with a camera triggered illumination. Each image is converted into a log image using Equation 1:

$$L_1(x,y,k) = \log(I_1(x,y,k)+1)$$
$$L_2(x,y,k) = \log(I_2(x,y,k)+1) \qquad \text{Equation 1}$$

where $I_1(x,y,k)$ denotes the intensity value of the kth color component of a pixel at the coordinate of (x,y), and $L_1(x,y,k)$ denotes the log-transformed intensity value. Other variables are defined in analog. Then, the global mean of each log image is computed:

$$M_1(k) = \frac{1}{Z} \sum_{x,y} L_1(x, y, k) \qquad \text{Equation 2}$$

$$M_2(k) = \frac{1}{Z} \sum_{x,y} L_2(x, y, k)$$

where $M_1(k)$ denotes the global mean of the kth color component of $L_1$ and Z is the size of the image. Other variables are defined in analogy.

Then a color difference image is obtained by taking the difference between the compensated non-illuminated frame and the frame bearing the additional illumination. Again, the selected sequence should not be regarded as a limitation.

$$D(x,y,k)=L_2(x,y,k)-\{L_1(x,y,k)+[M_2(k)-M_1(k)]\} \qquad \text{Equation 3}$$

where D (x, y, k) denotes the difference in the kth color component for a pixel at the coordinate of (x, y).

When there are multiple people at different distances or angles with respect to the illumination source, the illumination change is not uniform across the image. In this case, the compensation in Equation 3 should be performed based on local mean estimates of the log image.

$$M_1(x, y, k) = \frac{1}{Z_N} \sum_{x',y' \in N(x,y)} L_1(x, y, k) \qquad \text{Equation 4}$$

$$M_2(x, y, k) = \frac{1}{Z_N} \sum_{x',y' \in N(x,y)} L_2(x, y, k)$$

where $M_1(x, y, k)$ denotes the local mean of the kth color component of $L_1$, and N(x, y) denotes a local window centered around the current pixel at the coordinate of (x, y), and $Z_N$ is the size of the local window.

The following rules can be used to locate the pair of pupil regions (the rules are used for detecting the eye-defect known as the red eye-effect):

$$D(x,y,\text{red}) > \alpha \times D(x,y,\text{blue}) \qquad \text{Equation 5}$$
$$D(x,y,\text{red}) > \alpha \times D(x,y,\text{green}) \qquad \text{Equation 6}$$
$$D(x,y,\text{red}) > \beta \qquad \text{Equation 7}$$

where $\alpha$ is set to 2.0 and $\beta$ is set to 50 in this embodiment for the color difference image converted back to the original video metric. The operations defined by equations 5 to 7 can also be performed in the log image metric. Equations 5 and 6 ensure that there is significant higher increase in the red component relative to the other color components. Equation 7 ensures that the absolute increase in red component is significant. The coordinates of the pupils, as well as their sizes are extracted and stored. If multiple faces are present in the image, multiple pairs of pupils are detected. In case other eye-defects have to be detected or located than the red eye-effect (e.g. for "green eyes" or "yellow eyes" in animals), the equations 5 through 7 have to be amended with respect to the green color channel. In principle, this method can be generalized to detect any significant local changes in one or more color components.

Figure 8:
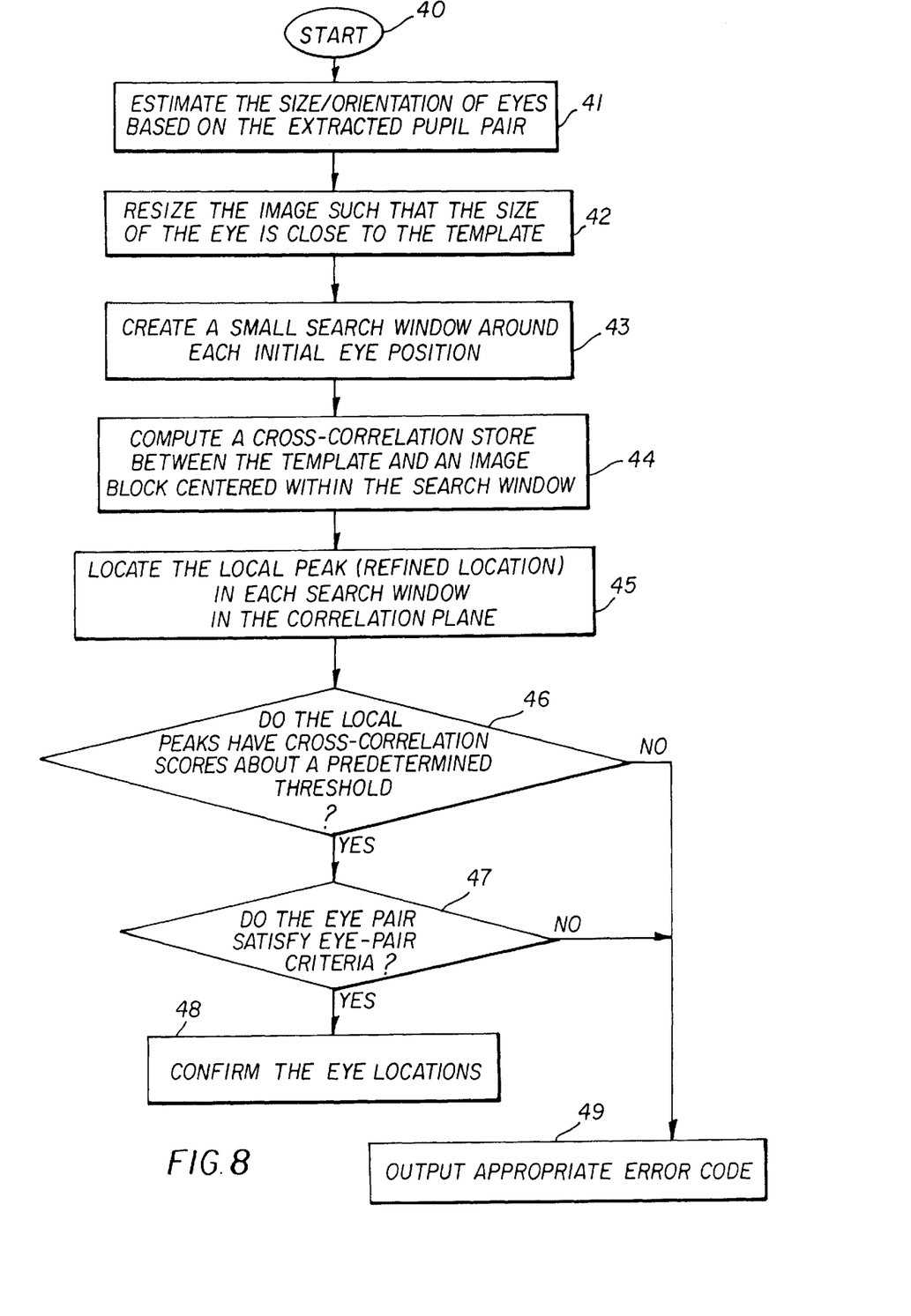
FIG. 8 is a block flow diagram of the eye location confirmation operations.

In particular, the eye confirmation step S26 (see FIG. 6), or S36 (see FIG. 7) includes the following steps as disclosed in FIG. 8. This step is mainly used to ensure the presence of the eye in order to limit false positive detection. For each extracted pupil pair, the size and orientation of the eyes are estimated based on the spacing of the pair. The estimated size is checked with respect to the pupil size S41. Next, a block of image is cut out after adjusting for size and orientation with respect to a pre-defined eye template S42. A plurality of such blocks of image can be extracted within a small search window around the initial pupil position S43. A cross-correlation score is computed between the pre-defined template and an image block centered within the small search window S44. Then, a local peak of cross-correlation is located within the search window S45. Note that the center of the pupil may coincide with the center of the eye in some cases. Therefore, depending on each application, a refined eye location can be obtained based on the local peak of cross-correlation. For red-eye removal, the center of the pupil is of interest. On the other hand, for spatial normalization of the face or pose estimation, the center of the eye is more desirable. If the local peaks do not have a cross-correlation score above a pre-defined threshold S46, an appropriate error code is output S49. Otherwise, the eye pair is further checked using a set of eye-pair criteria to ensure the presence of eyes. In particular, an intensity profile that goes through the centers of both eyes is extracted and smoothed. This profile is checked for the typical peaks and valleys that correspond to the main structure of eyes and the nose ridge between the eyes S47. If the eye-pair criteria are satisfied, the eye location is confirmed S48. Otherwise, an appropriate error code is output S49.

The illumination source 12 can be a flash unit mounted on or built into the film or digital camera. For an apparatus such as illustrated in FIG. 3, an infra-red (IR) illumination source can be used. For certain digital or film cameras, an IR source is used for auto-focusing and therefore can be used for red-eye generating and detection.

The invention has been described with reference to preferred embodiments. However, it will be appreciated that variations and modifications can be effected by a person of ordinary skill in the art without departing from the scope of the invention.

| PARTS LIST: | |
|---|---|
| 2 | eye |
| 3 | eye lens |
| 4 | retina |
| 5 | camera lens |
| 10 | apparatus |
| 12 | illumination source |
| 12a | image of the illumination source |
| 14 | means for capturing |
| 16 | driver circuit |
| 18 | frame grabber |
| 20 | optical lens |
| 22 | optical axis |
| 24 | electric cable |
| 26 | electronic means |
| 28 | monitor |
| 30 | computer |
| 32 | keyboard |
| 34 | storage or memory |
| 36 | printer |
| 40 | digital camera |
| 42 | user input control |
| 44 | central processing unit |
| 46 | memory |
| 48 | image taking sensor |
| 50 | photographic film camera |
| 52 | central processing unit |
| 54 | memory |
| 56 | recording means |
| 58 | photographic film |
| 60 | shutter |
| 62 | image sensor |
| 64 | semi-transparent mirror |
| 70 | light rays from the illumination source |
| 80 | light rays reflected from retina |

What is claimed is:

1. A method for determining the position of eyes within a frame of captured image data comprising the steps of:
    capturing two color frames of an image scene wherein one frame is captured with an ambient illumination and the other frame is captured with an additional illumination;
    storing said frames of said image scene in a memory;
    compensating said frames for the overall illumination change between said two captured frames to obtain a compensated frame;
    determining the difference between said compensated frame and an uncompensated frame of said two captured frames to obtain a compensated color difference image;
    scanning said compensated color difference image and determining pairs of regions of high intensity pixel value in at least one color channel; and
    outputting the data of pixel pair coordinates wherein each coordinate corresponds to a center of each region of high intensity pixel value in said color channel within said captured image scene.

2. The method according to claim 1, wherein said compensating step comprises:
    a) converting the value of each pixel in said captured frames into log metric;
    b) calculating the mean log intensity value of each of said converted images;
    c) adding the difference between said mean log intensity values to the converted image corresponding to the subtrahend of said difference; and
    d) converting said compensated log image to the inverse log metric to obtain a compensated frame.

3. The method according to claim 1, wherein said determined pairs of regions of high intensity pixel value, are processed in the red channel for human eyes, according to color, size, shape structure, and spacing.

4. The method according to claim 1, wherein said determined pairs of regions of high intensity pixel value, are processed in the green channel for animal eyes, according to color, size, shape structure, and spacing.

5. The method according to claim 1, wherein said determined pairs of regions of high intensity pixel value, preferably in the red and green channels for human and animal eyes, are processed according to color, size, shape structure, and spacing.

6. The method according to claim 1 further comprising the step of: analyzing the spacing of a potential eye location and the spatial structure for plausibility.

7. The method according to claim 1 wherein the outputting step comprises recording the pixel coordinates of the center of said regions of high intensity pixel value.

8. The method according to claim 1 wherein said frames of said image scene are consecutive pictures of a video image stream.

9. An apparatus for determining the position of eyes within a frame of captured image data comprising:
    means for capturing at least two color frames of an image scene, said means is provided with an optical lens defining an optical axis;
    means for storing the data of at least two consecutive captured frames of an image scene;
    an illumination source for illuminating one of said captured frames of said image scene wherein said illumination source is positioned as close as possible to said optical axis; and
    electronic means:
        a) for compensating said frames for the overall illumination change between said two captured frames to obtain a compensated frame;
        b) for determining the difference between said compensated frame and an uncompensated frame of said two captured frames to obtain a compensated color difference image;
        c) for scanning said compensated color difference image and determining pairs of regions of high intensity pixel value in at least one color channel; and d) for outputting the data of pixel pair coordinates wherein each coordinate corresponds to a center of each region of high intensity pixel value in said color channel within said captured image scene.

10. Apparatus according to claim 9 wherein the capturing means is a video camera for capturing consecutive frames of an image scene.

11. Apparatus according to claim 9 wherein the illumination source is a flash light emitting source for triggering direct illumination in synchronization with the capturing of the second image frame of said image scene.

12. Apparatus according to claim 9 wherein the electronic means is a computer to which a keyboard, a monitor, an external storage, and a printer are connected.

13. A method, used in a digital camera, for locating eye-defect regions comprises the steps of:

selecting a function of the digital camera for eye-defect free picture taking;

capturing two color frames of an image scene with a minimum delay in between to minimize spatial registration error, wherein one frame is captured with an ambient illumination and the other frame is captured with an additional camera triggered illumination;

storing data, representing said two captured frames in a memory;

compensating said frames for the overall illumination change between said two captured frames to obtain a compensated frame;

determining the difference between said compensated frame and an uncompensated frame of said two captured frames to obtain a compensated color difference image;

scanning said compensated color difference image and determining pairs of regions of high intensity pixel value in at least one color channel; and obtaining the data of pixel pair coordinates of said regions of bright intensity pixel value wherein each coordinate corresponds to a center of each of said eye-defect regions.

14. The method according to claim 13, wherein said compensating step comprises:

a) converting the value of each pixel in said captured frames into log metric;

b) calculating the mean log intensity value of each of said converted images;

c) adding the difference between said mean log intensity values to the converted image corresponding to the subtrahend of said difference; and d) converting said compensated log image to the inverse log metric to obtain a compensated frame.

15. The method according to claim 13 further comprising the step of: analyzing the spacing of a potential eye-defect region and the spatial structure for plausibility.

16. The method according to claim 13 wherein the outputting step comprises recording the pixel coordinates of the center of said eye-defect regions.

17. The method according to claim 15, wherein said determined eye- defect regions of high intensity pixel value, are processed in the red channel for human eyes, according to color, size, shape structure, and spacing.

18. The method according to claim 15, wherein said determined eye- defect regions of high intensity pixel value, are processed in the green channel for animal eyes, according to color, size, shape structure, and spacing.

19. The method according to claim 15, wherein said determined eye- defect regions of high intensity pixel value, preferably in the red and green channels for human and animal eyes, are processed according to color, size, shape structure, and spacing.

20. Method according to claim 13 wherein based on the user selection the digital camera performs an automatic eye-defect correction of the captured image scene.

21. Method according to claim 13 wherein, based on the user selection, the digital camera stores the data of the frame bearing said camera triggered illumination along with the obtained spatial data of the centers of each of said eye-defect regions.

22. A digital camera capable of locating eye-defect regions comprising:

a user input control for initiating the eye-defect correction function of the digital camera;

means for capturing two color frames of an image scene with a minimum delay between to minimize spatial registration error, wherein said capturing means is provided with an optical lens defining an optical axis;

an illumination source for illuminating one of the two frames of said image scene wherein said illumination source is positioned as close as possible to said optical axis;

means for storing the data of said two captured frames of said image scene; and electronic means:

for compensating said frames for the overall illumination change between said two captured frames to obtain a compensated frame;

for determining the difference between said compensated frame and an uncompensated frame of said two captured frames to obtain a compensated color difference image; and for scanning said compensated color difference image and thereby determining pairs of regions of eye-defect, and for calculating spatial coordinates of said eye-defects.

23. The digital camera according to claim 22 wherein said means for storing is used to store the captured image having the eye-defect correction automatically performed.

24. The digital camera according to claim 22 wherein said means for storing is used to store the data of the frame bearing said camera triggered illumination along with the calculated data of the spatial coordinates of the centers of each of said eye-defect regions.

25. Apparatus according to claim 22 wherein the illumination source is a flash light emitting source.

26. Apparatus according to claim 22 wherein the electronic means is a built-in central processing unit which controls the functions of the digital camera and an attached memory.

27. A method, used in a photographic film camera, for locating eye-defect regions comprising the steps of:

selecting a function of the photographic film camera for eye-defect free picture taking;

exposing the photographic film with a frame of an image scene bearing the camera triggered illumination and simultaneously storing data of said frame bearing the camera triggered illumination in a memory;

capturing a further frame of said image scene with a minimum delay in between to minimize spatial registration error, wherein said frame is captured with an ambient illumination, and storing data representing said frame in said memory;

compensating said frames for the overall illumination change between said two captured frames to obtain a compensated frame;

determining the difference between said compensated frame and an uncompensated frame of said two captured frames to obtain a compensated color difference image;

scanning said compensated color difference image and determining pairs of regions of high intensity pixel value in at least one color channel;

obtaining data of pixel pair coordinates corresponding to the pairs of regions of high intensity pixel value wherein each coordinate corresponds to a center of each of said eye-defect regions; and recording on the photographic film inside the camera coordinates of said pairs of regions of high intensity pixel value preferably in the red channel.

28. The method according to claim 27, wherein said compensating step comprises:

converting the value of each pixel in said captured frames into log metric;

calculating the mean log intensity value of each of said converted images;

adding the difference between said mean log intensity values to the converted image corresponding to the subtrahend of said difference; and converting said compensated log image to the inverse log metric to obtain a compensated frame.

29. The method according to claim 27 further comprising the step of analyzing the spacing of a potential eye-defect region and the spatial structure for plausibility.

30. The method according to claim 29, wherein said determined eye-defect regions of high intensity pixel value, are processed in the red channel for human eyes, according to color, size, shape structure, and spacing.

31. The method according to claim 29, wherein said determined eye-defect regions of high intensity pixel value, are processed in the green channel for animal eyes, according to color, size, shape structure, and spacing.

32. The method according to claim 29, wherein said determined eye-defect regions of high intensity pixel value, preferably in the red and green channels for human and animal eyes, are processed according to color, size, shape structure, and spacing.

33. Method according to claim 27 wherein based on the user selection, the digital camera performs an automatic eye-defect correction of the captured image scene.

34. Method according to claim 27 wherein based on the user selection the digital camera stores the data of the frame bearing said camera triggered illumination along with the obtained spatial data of the centers of each of said eye-defect regions.

35. The method according to claim 27, wherein said film includes a magnetic layer and, wherein the recording on the photographic film is magnetic recording on said magnetic layer.

36. A photographic film camera capable of locating eye-defects comprises:

a user input control for initiating the eye-defect free function of the film camera;

means for capturing two frames of an image scene with a minimum delay between to minimize spatial registration error, wherein said capturing means is provided with an optical lens defining an optical axis;

an illumination source for illuminating one of said two frames of said image scene, wherein said illumination source is positioned as close as possible to said optical axis;

a photographic film for capturing said illuminated frame of said image scene, said film including a recording layer;

means for temporarily storing data of said illuminated frame and data of said frame bearing ambient illumination of said image scene;

electronic means for compensating said frames for the overall illumination change between said two captured frames to obtain a compensated frame;

for determining the difference between said compensated frame and an uncompensated frame of said two captured frames to obtain a compensated color difference image;

for scanning said compensated color difference image and thereby determining pairs of regions of eye-defect, and calculating spatial coordinates of said eye-defects; and recording means for writing the spatial coordinates of the eye-defects in said recording layer on said photographic film inside said photographic film camera.

37. The photographic film camera according to claim 36 wherein the capturing means comprise a semi transparent mirror located in said optical axis in order to simultaneously illuminate said photographic film and an image sensor, said illumination of said photographic film is controlled by a shutter, positioned prior to said photographic film.

38. The photographic film camera according to claim 36 wherein the recording layer on said photographic film is a magnetic recording layer and the recording means are designed for magnetic recording of data on said magnetic recording layer.

39. The photographic film camera according to claim 36 wherein the illumination source is a flash light emitting source.

40. The photographic film camera according to claim 36 wherein said electronic means is a camera built-in central processing unit which controls the main camera functions, a memory for temporary storing and said recording means.

* * * * *